Dec. 3, 1963 J. C. SCHOPP ETAL 3,113,237

ADJUSTABLE VOLTAGE SUPPLY

Filed May 24, 1960 2 Sheets-Sheet 1

INVENTORS
JAMES C. SCHOPP &
LEONHARD E. ANNUS
BY
[signature]
Attorney

Dec. 3, 1963 J. C. SCHOPP ETAL 3,113,237

ADJUSTABLE VOLTAGE SUPPLY

Filed May 24, 1960 2 Sheets-Sheet 2

INVENTORS
JAMES C. SCHOPP &
LEONHARD E. ANNUS
BY
W. H. Sprague
ATTORNEY

United States Patent Office 3,113,237

Patented Dec. 3, 1963

3,113,237
ADJUSTABLE VOLTAGE SUPPLY

James C. Schopp, Merchantville, and Leonhard E. Annus, Camden, N.J., assignors to Radio Corporation of America, a corporation of Delaware Filed May 24, 1960, Ser. No. 31,348
14 Claims. (Cl. 315—31)

Figure 1:
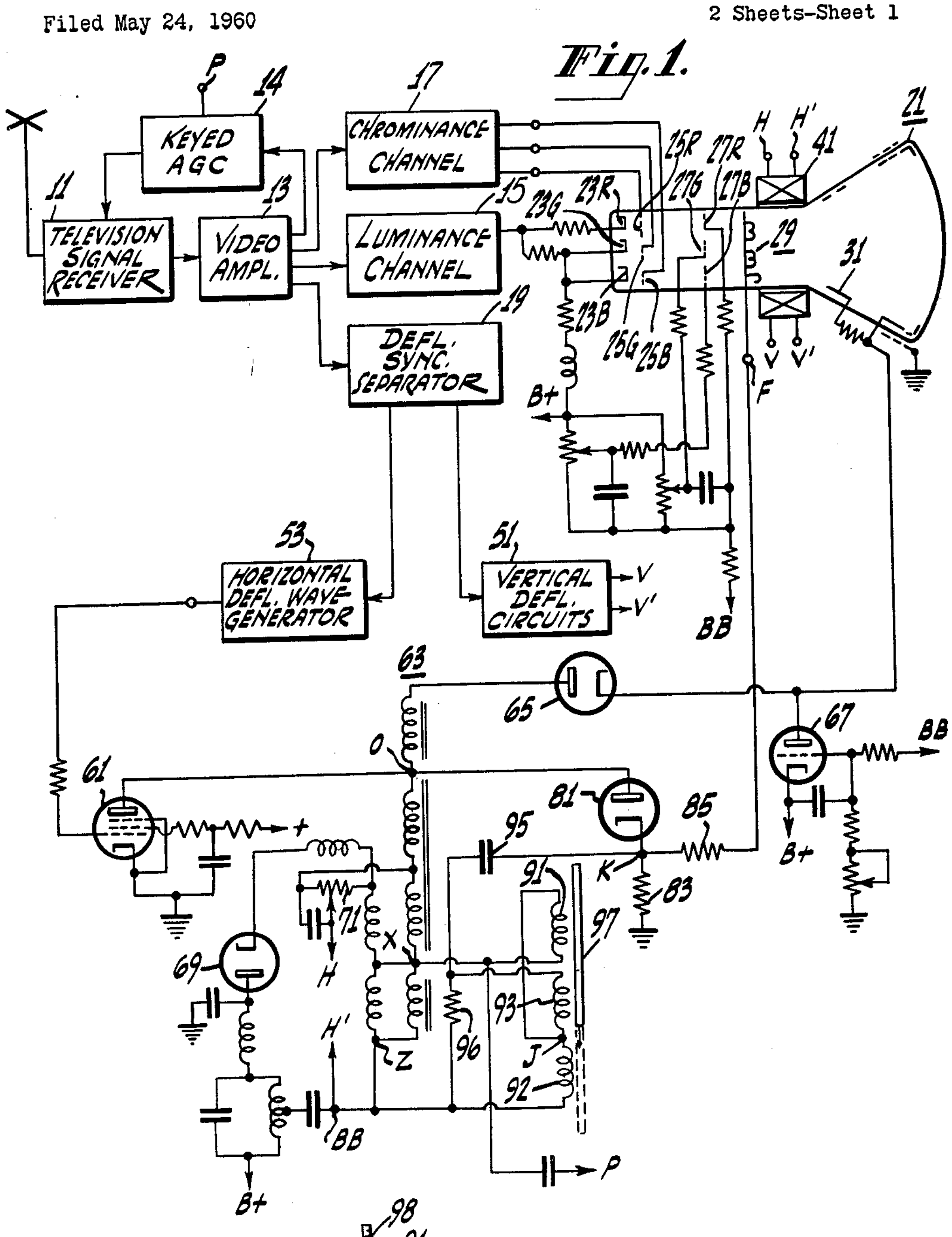

This invention relates generally to adjustable voltage supplies, and more particularly, but not exclusively, to apparatus for supplying an adjustable voltage to the focus electrode of a cathode ray tube.

In a cathode ray tube, beam focusing may be effected electromagnetically or electrostatically. In the color kinescopes conventionally employed as the color reproducing element in a color television receiver, electrostatic focusing is normally practiced. As a specific example, the RCA type 21CYP22A shadow mask color kinescope incorporates focusing electrode structure, which in use requires an operating voltage adjustable in the range of approximately 4,300 volts to 5,150 volts, for example. It is customary in color television receiver design to derive this relatively high operating voltage for the focusing electrode structure from a flyback pulse type supply, i.e. from a supply energized by the horizontal flyback pulses developed in the horizontal output transformer of the receiver's deflection circuitry.

A number of problems must be faced in operating upon such flyback pulses to provide a suitable supply for satisfying the focus voltage requirements of a color kinescope. The required range of adjustment is relatively wide, and the relatively high amplitude voltages involved suggest use of relatively expensive components in view of insulation requirements, etc. Poor regulation of the supply is even less tolerable in a color kinescope than in a black and white kinescope. Minimization of power consumption in the focus voltage supply is of heightened concern in a color television receiver, since the horizontal output circuitry is subject to such additional power demands as are involved in supplying the convergence circuitry of the color receiver, such additional demands not being imposed in a black and white receiver.

The present invention is directed to a novel adjustable voltage supply of such a character as to permit satisfactory compliance with the difficult requirements of a color kinescope focus supply, but achieving these objectives with an arrangement of relatively inexpensive components. In accordance with the invention, first and second windings are connected in series between the output terminals of an input voltage source, a third winding is connected between the junction of the first two and an output terminal, and an adjustable inductive coupling is arranged for differentially varying the coupling between the first and third windings and between the second and third windings. By this arrangement, a pulse output, which may be varied across a substantial range of pulse amplitudes of both polarities, is obtained.

In accordance with a particular embodiment of the present invention, the focus rectifier is arranged with its input electrode connected to a fixed terminal on the receiver's horizontal output transformer, the flyback pulse amplitude level at the fixed terminal being such as to permit development at the focus rectifier output electrode of a D.C. voltage corresponding to an intermediate voltage in the desired range of focus voltage adjustment. Additionally, a flyback pulse at a much lower voltage level and of a variable amplitude and polarity is applied to the rectifier device output electrode. Selection of the polarity of the additionally supplied pulse determines whether the output voltage of the supply will represent the aforesaid intermediate voltage augmented by an added incremental voltage or the aforesaid intermediate voltage lessened by an effectively subtracted incremental voltage. Variation in the amplitude of this additionally supplied pulse controls the amount of augmentation or lessening of the aforesaid intermediate voltage. Development of this variable amplitude, variable polarity pulse is achieved through use of a novel arrangement of inductances in association with an additional pair of fixed terminals on the horizontal output transformer.

In a preferred form of this inductance arrangement, a first and a second winding are connected in series across the additonal pair of fixed terminals on the transformer, both of these fixed terminals being relatively low voltage terminals thereof, and the amplitude of the flyback pulse appearing between these terminals being of an order of voltage corresponding to approximately half the width of the desired range of focus voltage adjustment. The pulse output terminal of the inductance arrangement, at which appears the variable amplitude, variable polarity pulse for delivery to the focus rectifier output electrode, is coupled via a third winding to the junction of the first and second windings. A common, adjustable magnetic core is associated with the first, second and third windings, and serves both (*a*) to differentially vary the inductances of the first and second windings, and (*b*) to simultaneously differentially vary the degree of coupling between the third and first windings, on the one hand, and between the third and second windings, on the other hand. The coupling between the first and third windings is oppositely poled with respect to the coupling between the second and third windings.

In operation, adjustment of the common core of the above described inductance arrangement has a two-fold effect on the nature of the pulse appearing at the pulse output terminal of the inductance arrangement. In the first place, it controls the effect of the first and second windings as an inductance divider of the pulse voltage appearing between the pair of fixed terminals of the transformer. That is, in one extreme of core adjustment, the inductance ratio of the first and second windings is such as to provide a pulse voltage at their junction point of maximum amplitude, approaching the amplitude of the pulse appearing between the fixed transformer terminals; in the other extreme of core adjustment, the amplitude of the pulse voltage appearing at the winding junction point is at a minimum, approaching zero amplitude, the inductance ratio of the first and second windings being inverted. Additionally, however, adjustment of the core differentially varies the degree of coupling between the third winding and each of the second and first windings. Since these couplings are oppositely poled, it may be appreciated that in one extreme of core adjustment, the pulse voltage developed across the third winding will be of one polarity, whereas at the other extreme of core adjustment, the pulse voltage developed thereacross will be of the opposite polarity. The pulse voltage appearing at the pulse output terminal of the inductance arrangement will be the summation of (*a*) the pulse voltage appearing at the junction of the first and second windings, and (*b*) the pulse voltage developed across the third winding.

The focus voltage supply described above has many practical advantages. The use of inductances to effect the desired voltage adjustments permits achievement of the desired regulation properties for the supply without involving the use of such power consuming components as the usual resistive potentiometers. The inductances employed are subjected only to relatively low voltages, whereby they may take an inexpensive form. A wide range of output voltage adjustment is nevertheless achieved, and this achievement takes place without the need for high voltage step-up ratios in conjunction with the coupled windings, whereby serious ringing problems are avoided.

Accordingly, it is a primary object of the present invention to provide a novel adjustable voltage supply providing a relatively wide range of adjustment of a high voltage without requiring the use of expensive components.

A further object of the present invention is to provide a novel focus voltage supply for a color kinescope which achieves the desired range of adjustment in a circuit arrangement of relatively inexpensive components.

Figure 1A:
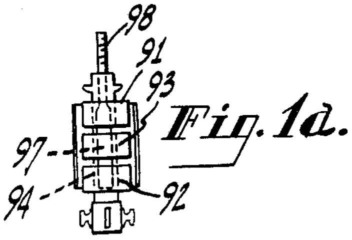

Other objects and advantages of the present invention will be appreciated by those skilled in the art after a reading of the following detailed description and an inspection of the accompanying drawings in which:

FIGURE 1 illustrates in block and schematic form a color television receiver incorporating a focus voltage supply in accordance with an embodiment of the present invention;

FIGURE 1*a* illustrates the physical detail of a form of winding structure which may be employed in practicing the FIGURE 1 embodiment of the invention;

FIGURES 2*a*, 3*a*, 4*a* and 5*a* comprise respective partial schematics of the focus supply apparatus of FIGURE 1, of aid in explaining the operation of the FIGURE 1 embodiment of the present invention;

FIGURES 2*b*, 3*b*, 4*b* and 5*b* are associated with FIGURES 2*a*, 3*a*, 4*a* and 5*a*, respectively, and illustrate graphically adjustment effects on voltages at various points in the respectively associated schematic diagrams.

In FIGURE 1, a color television receiver of a generally conventional type is illustrated mainly in block form, with, however, details of the horizontal output circuitry and associated voltage supplies shown schematically. The illustrated receiver is of the general form exemplified by the RCA color television receiver chassis No. CTC9A&B, details of which are presented in the RCA Victor Preliminary Service Data Pamphlet designated 1959 No. T6. Carrier waves modulated by a composite color television signal are illustrated as being received by conventional signal receiving apparatus 11, which may include the usual RF tuner, frequency converting apparatus, IF amplifier, signal detector, etc. The video frequency signals recovered from the modulated carrier in the receiving apparatus 11 are amplified in the video amplifier 13, and supplied to a keyed AGC circuit 14 (operating to control amplifier gain in the signal receiving apparatus 11 in accordance with conventional automatic gain control principles), to a luminance channel 15, to a chrominance channel 17, and to deflection sync separator apparatus 19. The chrominance channel 17 may comprise the usual bandpass amplifier for selectively supplying the modulated color subcarrier component of the composite signal, color demodulation apparatus for synchronously detecting the color subcarrier at appropriate subcarrier phases to recover color difference information, and matrixing apparatus for processing the color difference information to forms suitable for application to a color image reproducer. A three-gun, shadowmask, color kinescope 21 serves as the color image reproducer of the illustrated receiver. The electrode structure of the color kinescope 21 includes respective red, green and blue cathodes 23R, 23G, and 23B; respective red, green and blue control grids 25R, 25G and 25B; respective red, green and blue screen electrodes (also known as first or accelerating anodes) 27R, 27G and 27B; focusing electrode structure 29 and an ultor electrode (or final anode) 31. The target assembly of the color kinescope 21 comprises a phosphor screen composed of a regular array of red-, green-, and blue-emitting phosphor dots and an associated perforated mask.

Associated with the color kinescope 21 is a deflection yoke 41, responding to respective vertical and horizontal deflection waves to cause the color kinescope beams to trace a raster on the phosphor screen; also conventionally associated with the kinescope 21 is a convergence yoke (not illustrated) responding to suitable dynamic convergence waveforms to cause the color kinescope beams to properly converge in the target region throughout the scanning of the raster.

The color difference signal outputs of the chrominance channel 17 are applied individually to the respective control grids 25R, 25G and 25B of the kinescope 21. The respective cathodes 23R, 23G and 23B are driven in common by the output of the luminance channel 15, which serves to amplify the luminance component of the composite signal and includes suitable delay apparatus (not shown) to equalize the delay of the luminance component with the delay suffered by the chrominance information in the chrominance channel 17.

The output of the sync separator 19 is supplied to the vertical deflection circuits 51 and to the horizontal deflection wave generator 53. The vertical deflection circuits 51 generate a vertical deflection wave for application to the terminals V, V' of the deflection yoke 41, under the control of vertical synchronizing pulses derived from the sync separator apparatus 19. The horizontal sawtooth generator 53 develops a horizontal frequency sawtooth frequency wave under the control of horizontal synchronizing pulses derived from the sync separator apparatus 19. The generator 53 incorporates suitable deflection AFC apparatus for assuring the desired synchronization.

The output of generator 53 is applied to the control grid of the horizontal output tube 61. The horizontal winding terminals H, H' of the yoke 41 derive line frequency scanning waves from the horizontal output transformer 63, to which the anode of output tube 61 is coupled. High voltage for the ultor electrode 31 of the kinescope 21 is produced by the high voltage rectifier 65 from flyback pulses developed in the output transformer 63; a shunt regulator tube 67 serves to maintain the ultor voltage substantially constant despite variations in the loading on the ultor supply due to changes in picture content. The conventional damper tube 69 is also coupled to the output transformer, and in accordance with well-known power recovery principles, enables development of an augmented power supply voltage (i.e. the so-called B-boost voltage, which is available at terminal BB for use at various points in the receiver). A potentiometer 71 is provided in association with a pair of bifilar wound portions of the output transformer 63 to permit adjustment of the horizontal centering of the raster displayed on the phosphor screen. Flyback pulses appearing at intermediate terminal X of transformer 63 are capacitively coupled to the keying pulse input terminal P of the keyed AGC circuit 14.

The apparatus associated with output transformer 63 which is of particular interest herein is the apparatus which serves to derive from the flyback pulses appearing in the windings of transformer 63 an adjustable D.C. voltage for application to the focusing electrode terminal F of the color kinescope 21. This apparatus comprises a diode 81, which serves as the focus rectifier; the anode of diode 81 is directly connected to an intermediate terminal O of the transformer 63. The cathode of diode 81 is returned to a point of reference potential (e.g. chassis ground) by means of a load resistor 83. A resistor 85 provides a direct current connection between the cathode of the diode 81 and the focus electrode terminal F of the color kinescope 21.

A first and a second winding, 91 and 92, respectively, are connected in series between a pair of low voltage terminals X and Z on the transformer 63. The junction J of the series connected windings 91 and 92 is coupled to the cathode of the diode 81 by means of a third winding 93 in series with a capacitor 95. A damping resistor 96 shunts the series combination of the third winding 93 and the second winding 92. A common core 97 of magnetic material is associated with the first, second and third windings 91, 92 and 93, and is subject to adjustable positioning with respect to the associated windings.

The length of the core and its distance of travel is related to the length of the respective windings and their positions on a common coil form or support so that, in one extreme of adjustment of the core 97, the following conditions prevail: (*a*), the degree of coupling between the first winding 91 and the third winding 93 is at a maximum, while the degree of coupling between the second winding 92 and the third winding 93 is at a minimum; and, (*b*), the inductance exhibited by winding 91 is at a maximum value, while the inductance exhibited by winding 92 is at a minimum. In the other extreme of adjustment of core 97, the following conditions prevail: (*a*), the degree of coupling between the second winding 92 and the third winding 93 is at a maximum, while the degree of coupling betweent he first winding 91 and the third winding 93 is at a minimum; and, (*b*), the inductance exhibited by the first winding 91 is at a minimum value, while the inductance exhibited by the second winding 92 is at a maximum value.

The coupling between the second winding 92 and the third winding 93 is such that pulses transferred to winding 93 from the transformer 63 via the inductive coupling between winding 92 and winding 93 appear at the upper terminal of winding 93 with a polarity relative to the lower terminal of winding 93 which is the same as the polarity which the pulses appearing at the upper transformer terminal X bear with respect to the lower transformer terminal Z. On the other hand, the coupling between winding 91 and winding 93 is such that the pulses transferred to winding 93 from the transformer 63 via inductive coupling between windings 91 and 93 appear at the upper terminal of winding 93 with a polarity relative to the lower terminal of winding 93 which is opposite to the polarity which the pulses appearing at the upper transformer terminal X bear with respect to the lower transformer terminal Z.

In FIGURE 1*a*, an illustrative form which the above-described winding structure may take is shown in physical detail. The windings 91, 93, and 92, are supported, in the order named, on a common coil form 94. A common core 97 of magnetizable material is enclosed within the coil form 94, and affixed to a threaded bolt 98 which permits adjustment of the core position between the extremes noted above.

As the position of core 97 is adjusted between the first mentioned extreme and the second mentioned extreme, the D.C. voltage supplied to the focus electrode terminal F is varied between a maximum D.C. value and a minimum D.C. value, respectively. In a specific working example of the circuitry of FIGURE 1, wherein the amplitude of the pulse appearing between transformer terminals O and Z is +4,900 volts, and the amplitude of the pulse appearing between transformer terminals X and Z is +350 volts, the maximum D.C. voltage supplied at focus electrode terminal F is approximately +5,150 volts, and the minimum is +4,300 volts. To appreciate how such a wide range of adjustment of focus voltage is achieved by the operation of the apparatus described above, attention is now directed to the successive partial schematics of FIGURES 2*a*, 3*a*, 4*a* and 5*a*, and to the respectively associated graphs of FIGURES 2*b*, 3*b*, 4*b* and 5*b*.

Figure 2A:
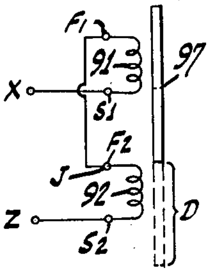

In FIGURE 2*a*, the windings 91 and 92 are shown in their serially connected relationship across the transformer terminals X and Z. It is assumed that the windings 91 and 92 are wound in the same direction on a common coil form. The upper transformer terminal X is directly connected to the start (designated S1) of the first winding 91. The finish (designated F1) of the first winding 91 is directly connected to the finish (designated F2) of the second winding 92. The start (designated S2) of the second winding 92 is directly connected to the lower transformer terminal Z. The position of the common core 97 which is shown in solid line will be considered as the reference or zero position of the core. In this core position, the core is wholly withdrawn from the second winding 92, and extends within the entire length of the first winding 91. In the position of maximum departure from the reference or zero position, i.e. that position shown in dotted lines, the common core 97 is wholly withdrawn from the first winding 91, and extends within the entire length of the winding 92. The distance traveled by the core in adjustment between these two extremes is designated D.

Figure 2B:
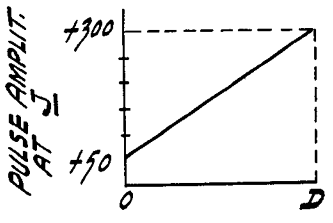

FIGURE 2*b* illustrates the effect on the amplitude of the pulse appearing at the winding junction J (i.e. the point of interconnection of the first winding finish F1 and the second winding finish F2) of travel of the common core between the two extremes. The graph shows that the pulse amplitude varies between a value of +50 at the reference position to a value of +300 after a core travel of the distance D from the reference position. This variation can be explained by viewing the arrangement of windings 91 and 92 as an inductive divider of the pulse voltage appearing between the transformer terminals X and Z, with core adjustment varying the ratio of the inductances making up the divider. In the reference position of the core, the inductive impedance presented by the first winding 91 is high, while the inductive impedance presented by the second winding 92 is low. The pulse voltage at the junction J, reflecting the attenuation of the transformer supplied pulse by a factor proportional to the second winding impedance divided by the sum of the first and second winding impedances, is accordingly low. At the other extreme of positional adjustment of core 97, the inductive impedance presented by the second winding 92 is high, while the inductive impedance presented by the first winding 91 is low; accordingly, the amplitude of the pulse appearing at the junction J is relatively high.

Figure 3A:
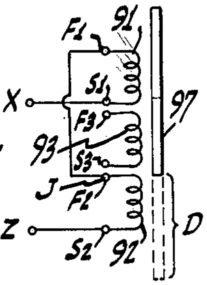
Figure 3B:
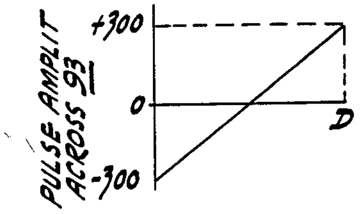

In FIGURE 3*a*, the partial schematic of FIGURE 2*a* is supplemented by the additional showing of the third winding 93. The third winding 93 is wound in the same direction on the common coil form as the first and second windings. In FIGURE 3*b*, the effect of travel of the common core 97 from the reference position on the amplitude of the pulse appearing across the third winding is shown; polarity is expressed in this graph in terms of the finish (designated F3) of the third winding 93 (i.e. appearance of a pulse across winding 93 in a polarity rendering the finish F3 more positive than the start S3 of winding 93 is represented by the + values of the ordinate in the graph of FIGURE 3*b*). Inspection of the graph of FIGURE 3*b* shows that the amplitude of the pulse appearing across the winding 93 varies from −300 volts at the reference position of the core 97 to a value of +300 volts after travel of core through the distance D, with the amplitude of the pulse being zero at a position intermediate the two extremes.

To explain this variation in both amplitude and polarity of the pulse developed across the winding 93, one must first appreciate that the couplings between windings 91 and 93, on the one hand, and between windings 92 and 93, on the other hand, are effectively oppositely poled. Thus, pulses appearing across winding 93 due to inductive coupling from the winding 91 will be opposite in polarity to pulses appearing across winding 93 due to coupling from the winding 92. In the reference position of the core, the degree of coupling between windings 91 and 93 is at a maximum, and that between windings 92 and 93 is at a minimum, whereby the developed pulse is a maximum amplitude in the polarity determined by the winding 91-winding 93 coupling. At the opposite extreme of adjustment, the degree of coupling between winding 92 and winding 93 is at a maximum, and that between winding 91 and 93 is at a minimum, whereby the developed pulse has a maximum amplitude in the polarity determined by the winding 92-winding 93 coupling.

Figure 4A:
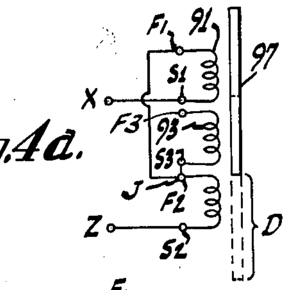
Figure 4B:
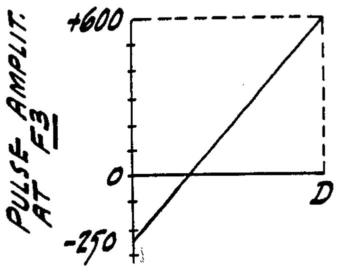

In FIGURE 4*a*, the partial schematic of FIGURE 3*a* is supplemented by the showing of a direct connection between the start S3 of the winding 93 and the junction of the finishes F1 and F2 of windings 91 and 92. FIGURE 4*b* illustrates the effect of the travel of common core 97 from its reference position on the amplitude of the pulse appearing at finish F3 of winding 93. Inspection of the graph of FIGURE 4*b* shows that the pulse amplitude at F3 varies from a value of −250 volts at the reference position of the core to a value of +600 volts after travel of the core 97 through the distance D. Comparison of the graph of FIGURE 4*b* with the graphs of the preceding FIGURES of 2*b* and 3*b* shows that the pulse amplitude variation illustrated in FIGURE 4*b* is equivalent to the sum of the pulse amplitude variations shown in FIGURES 2*b* and 3*b*. That this relationship is appropriate will be seen when one recognizes that due to the connection of the start S3 of winding 93 to the junction of windings 91 and 92, the pulse voltage appearing at finish F3 of winding 93 represents the sum of the pulse voltage appearing at the junction and the pulse voltage appearing across winding 93.

Figure 5B:
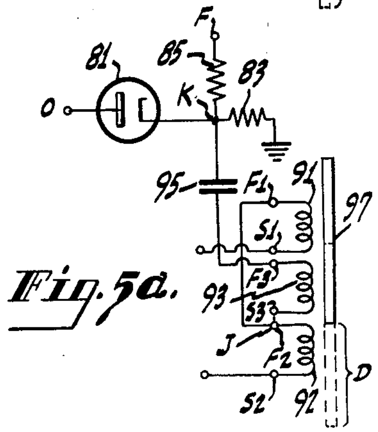
Figure 5B:
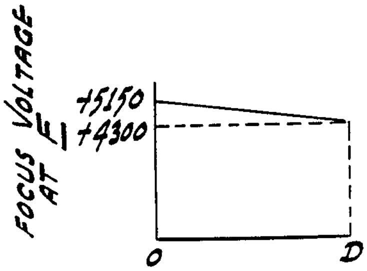

FIGURE 5*a* supplements the partial schematic of FIGURE 4*a* by showing the focus rectifier 81, the direct coupling of its anode to the transformer terminal O, the return of its cathode to ground via the load resistor 83, the direct current coupling of its cathode via current limiting resistor 85 to the kinescope focus electrode terminal F, and the coupling of the finish F3 of winding 93 via capacitor 95 to the cathode of diode 81. FIGURE 5*b* illustrates the effect on the D.C. voltage supplied to the focus electrode terminal F of adjustment of core 97 from its reference position. Inspection of FIGURE 5*b* shows that the supplied D.C. voltage varies from a value of +5,150 volts at the reference position to a value of +4,300 volts after travel of the core through the distance D. Comparison of the graph of FIGURE 5*b* with the graph of the preceding FIGURE 4*b* reveals that the focus voltage variation represented in FIGURE 5*b* corresponds to an algebraic subtraction of the pulse amplitude variation represented in FIGURE 4*b* from a fixed pulse amplitude value of +4,900 volts. In making this comparison it should be noted that, for convenience of illustration, the ordinate scale of FIGURE 5*b* is compressed relative to that of FIGURE 4*b*. The appropriateness of this relationship will be appreciated when one considers that the variable amplitude pulse appearing at the finish F3 at the winding 93 is applied to the cathode of diode 81, while the fixed amplitude (+4,900 volts) pulse derived from transformer terminal O is supplied to the anode of diode 81. When the variable amplitude pulse is of the same polarity (i.e. plus) as the fixed amplitude pulse, the variable amplitude pulse effectively bucks out a portion of the fixed amplitude pulse, resulting in the production of a D.C. voltage which is less than the value obtained from the fixed amplitude pulse alone by an amount determined by the amplitude of the variable amplitude pulse. On the other hand, when the variable amplitude pulse is opposite in polarity to the fixed amplitude pulse, the relationship is an aiding one and the two pulses effectively add, resulting in the production of a D.C. voltage which exceeds the value produced from the fixed amplitude pulse alone by an amount determined by the amplitude of the opposite polarity variable amplitude pulse.

The above described adjustable focus voltage supply possesses a number of practical advantages. A relatively low source impedance, desirable from a regulation point of view, it realized with relatively little power being consumed by the components of the adjustable supply. Use of inductances as the adjustable elements is a primary factor in such an achievement. By relegating the adjustable elements to the function of adjusting the amplitude of an auxiliary pulse serving to aid or buck a main fixed amplitude pulse, rather than requiring the adjustable elements to adjust the amplitude of the main pulse (i.e. a pulse of an amplitude in the relatively high focus voltage range), the need for expensive inductances is avoided. That is, the adjustable inductances are subjected to relatively low voltages only; insulation requirements, for example, are therefore minimized. Also, the pulse amplitude of the input required for the adjustable portion of the supply is of such a magnitude that a special tap therefor on the deflection transformer may not be required; thus, for example, in the illustrated embodiment, the transformer tap already provided for AGC keying purposes is appropriate for supplying the input to the adjustable portion of the focus voltage supply.

It will be appreciated that a wider range of pulse output than that described might be obtained from the adjustable portion of the supply if the third winding 93 were provided with an increased number of turns, i.e. if a higher voltage step up ratio were associated with the coupled windings. However, the problem of ringing introduction is increased if high voltage step-up ratios are attempted. Resistor 96 is employed in the FIGURE 1 supply circuit for the purpose of damping the introduced ringing, and performs this function adequately. It may be observed that, if voltage step up ratios are employed which are significantly higher than roughly one to one, the ringing problem becomes appreciable, and solution of the problem by simple resistive damping may not be practically feasible.

It may be observed that, in the FIGURE 1 circuit, the usual filter capacitor, coupled between the diode cathode and ground, has been omitted, and reliance has been placed on the adjustable pulse coupling capacitor 95 to achieve at least partially the usual filtering function. As a result of this relatively incomplete filtering of the D.C. voltage supplied to the focus electrode, a pulse component remnant may appear superimposed upon the D.C. focusing voltage. It has been determined in practice that this incompleteness of filtering may be readily tolerated, since it disturbs the focus voltage value only at a time when the kinescope beams are blanked. It will, of course, be appreciated that if one wishes to do so, one may modify the illustrated circuit by adding the usual filter capacitor.

It will be recognized that, in the use of the focus voltage adjusting apparatus of the present invention, there is involved a sacrifice of some small percentage of the available scanning power since a portion of the reactive power is lost in circulation in the focus adjusting inductances. The total inductance presented across the output transformer by the focus adjusting apparatus is preferably chosen to be of such a magnitude as to restrict the loss in scan due to shunting effect to 3% or less; as an illustrative example of such a desired magnitude, it may be noted that apparatus of the type shown in FIGURE 1 provided satisfactory performance with a total inductance presentation of approximately 17 to 18 millihenries. Care should be taken in dimensioning the respective windings, inter-winding spacings, core length, etc., in order that variation of the core position does not significantly alter the total inductance presented from the chosen magnitude (to avoid scan changes with focus voltage adjustments).

What is claimed is:

1. An adjustable voltage supply comprising the combination of an input voltage source having a pair of output terminals, a first winding, a second winding, means for connecting said first and second windings in series between said output terminals of said source, a third winding, a supply output terminal, means for connecting said third winding between said supply output terminal and the junction of said serially connected first and second windings, said third winding being adjustably inductively coupled to said first winding and adjustably inductively coupled to said second winding, and means for differentially varying the coupling between said first and third windings and the coupling between said second and third windings.

2. Apparatus in accordance with claim 1 wherein the coupling between said first and third windings is oppositely poled with respect to the coupling between said second and third windings.

3. Apparatus in accordance with claim 1 wherein said differentially coupling varying means also serves to differentially vary the inductances exhibited by said first and second windings.

4. Apparatus in accordance with claim 3 wherein said first, second and third windings are mounted on a common coil form enclosing a common core, and wherein said varying means comprises means for adjusting the position of said common core within said common coil form.

5. An adjustable voltage supply comprising in combination a pulse transformer having first, second and third terminals, a relatively high potential pulse appearing between said first and third terminals and a relatively low potential pulse appearing between said second and third terminals when the transformer is energized, a rectifier having an input electrode coupled to said first transformer terminal and having an output electrode, a first winding, a second winding, means for connecting said second transformer terminal through said first and second windings in series to said third transformer terminal, a third winding, means for coupling said third winding between said rectifier output electrode and the junction of said series connected first and second windings, and means for adjusting the voltage developed at said rectifier output electrode, said last named means comprising an adjustably positioned common core for said first, second and third windings.

6. In cathode ray tube apparatus including a cathode ray tube having electrode structure requiring an adjustable operating voltage, an adjustable voltage supply for supplying said adjustable output voltage to said electrode structure, said supply comprising in combination a source of pulses having a first output comprising a relatively high potential pulse and a second output comprising a relatively low potential pulse, a rectifier having an input electrode and an output electrode, means for applying said first output of said pulse source to said rectifier input electrode, a pair of windings connected in series to form a series combination, means coupled to said pulse source for applying said second output across said series combination, a third winding, means for coupling said third winding between said rectifier output electrode and the point of interconnection of said pair of windings in said series combination, and means for connecting said rectifier output electrode to said cathode ray tube electrode structure.

7. Apparatus in accordance with claim 6 wherein means are provided for differentially varying the respective inductances of said pair of windings.

8. Apparatus in accordance with claim 6 wherein said third winding is inductively coupled to said pair of windings, and wherein means are provided for simultaneously varying the degree of coupling between said third winding and each of said pair of windings, said coupling varying means being characterized in that variation in one direction of the degree of coupling between said third winding and one of said pair of windings is accompanied by variation in the opposite direction of the degree of coupling between said third winding and the other of said pair of windings.

9. Apparatus in accordance with claim 8 wherein the coupling between said third winding and said one winding is oppositely poled with respect to the coupling between said third winding and said other winding.

10. In a color television receiver including a color kinescope having a focus electrode, and also including a deflection transformer subject to the periodic appearance of flyback pulses, an adjustable focus voltage supply comprising in combination a focus rectifier having an anode and a cathode, means coupled to said transformer for applying relatively fixed amplitude flyback pulses of a first magnitude to said focus rectifier anode, an inductance divider having a pair of end terminals and an intermediate terminal, means coupled to said transformer for applying relatively fixed amplitude flyback pulses of a second magnitude, smaller than said first magnitude, across the end terminals of said inductance divider, an inductor inductively coupled to said inductance divider, means for coupling said inductor between said inductance divider intermediate terminal and said focus rectifier cathode, and a focus voltage supply output terminal connected to said focus rectifier cathode.

11. Apparatus in accordance with claim 10 wherein means are provided for varying the amplitude and polarity of flyback pulses transferred to said inductor via inductive coupling to said inductance divider.

12. Apparatus in accordance with claim 11 wherein said last named means simultaneously serves to vary the pulse voltage division effected at said intermediate terminal by said inductance divider.

13. In a color television receiver including a color kinescope having a focus electrode, and also including a deflection transformer subject to the periodic appearance of flyback pulses, said transformer having first and second terminals, flyback pulses appearing at said first terminal with a first relatively high amplitude, and flyback pulses appearing at said second terminal with a relatively low amplitude; a focus voltage supply comprising in combination a diode having an anode and cathode, means for coupling said diode anode to said first transformer terminal, a first winding, a second winding, means for connecting said first and second windings in series between said second transformer terminal and a point of reference potential, a third winding having first and second end terminals, means for connecting the first end terminal of said third winding to the junction of said series connected first and second windings, a capacitor coupled between said diode cathode and said second end terminal of said third winding, a first resistor connected between the junction of said third winding and said capacitor and said point of reference potential, a second resistor connected between said diode cathode and said point of reference potential, and a third resistor connected between said diode cathode and said focus electrode.

14. Focus voltage supply apparatus in accordance with claim 13 wherein said first, second and third windings are mounted on a common coil form enclosing an adjustably positioned common core, and wherein said core is adjustable between a first and a second position, movement of said core from said first to said second position resulting simultaneously in reducing the inductance of said first winding, increasing the inductance of said second winding, reducing inductive coupling between said first and third windings, and increasing inductive coupling between said second and third windings, the coupling between said first and third windings being effectively oppositely poled to the coupling between said second and third windings.

References Cited in the file of this patent

UNITED STATES PATENTS

| | | |
|---|---|---|
| 1,148,279 | Von Arco et al. | July 27, 1915 |
| 2,289,670 | McClellan | July 14, 1942 |
| 2,534,557 | Ostreicher | Dec. 19, 1950 |
| 2,588,659 | Pond | Mar. 11, 1952 |
| 2,867,750 | Vonderschmitt | Jan. 6, 1959 |
| 2,880,366 | Armstrong | Mar. 31, 1959 |

FOREIGN PATENTS

| | | |
|---|---|---|
| 748,429 | Great Britain | May 2, 1956 |